US012071019B2

(12) United States Patent
Wimmer et al.

(10) Patent No.: US 12,071,019 B2
(45) Date of Patent: Aug. 27, 2024

(54) ELECTRIC AXLE DRIVE UNIT WITH INTEGRATED BRAKE DEVICE WITH AXIALLY MOVABLE BRAKE DISC ELEMENT

(71) Applicant: Schaeffler Technologies AG & Co. KG, Herzogenaurach (DE)

(72) Inventors: Doris Maria Wimmer, Ottenhofen (DE); Simon Ortmann, Baden-Baden (DE); Philippe Wagner, Souffelweyersheim (FR); Aurelien Grauss, Mommenheim (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 483 days.

(21) Appl. No.: 17/422,906

(22) PCT Filed: Dec. 17, 2019

(86) PCT No.: PCT/DE2019/101098
§ 371 (c)(1),
(2) Date: Jul. 14, 2021

(87) PCT Pub. No.: WO2020/147881
PCT Pub. Date: Jul. 23, 2020

(65) Prior Publication Data
US 2022/0161649 A1 May 26, 2022

(30) Foreign Application Priority Data

Jan. 14, 2019 (DE) ......................... 102019100738.0

(51) Int. Cl.
*B60K 7/00* (2006.01)
*B60K 1/00* (2006.01)
(Continued)

(52) U.S. Cl.
CPC .......... *B60K 7/0007* (2013.01); *F16D 65/186* (2013.01); *B60K 2001/001* (2013.01);
(Continued)

(58) Field of Classification Search
CPC .............. F16D 65/186; F16D 2121/02; F16D 2125/40; B60B 27/0052; B60T 1/062;
(Continued)

(56) References Cited

U.S. PATENT DOCUMENTS 6,135,259 A 10/2000 Forster
2006/0054431 A1 3/2006 Gilles et al.
(Continued)

FOREIGN PATENT DOCUMENTS

CN 102673380 12/2014
CN 102958729 6/2016
(Continued)

*Primary Examiner* — Robert A. Siconolfi
*Assistant Examiner* — San M Aung
(74) *Attorney, Agent, or Firm* — Volpe Koenig

(57) ABSTRACT

An electric axle drive unit for a motor vehicle, having an electric motor with a stator that is fixedly received in a housing, and a rotor that is rotatably mounted relative to the stator and rotationally coupled or coupleable to a wheel hub. A brake device is operatively connected to the wheel hub. The brake device has a first brake component fixedly supported on the housing, a second brake component rotationally fixed to the wheel hub that is frictionally connectable to the first brake component, and an actuation unit that applies a braking force that interconnects the brake components. One of the brake components has a brake disc element rotationally fixed to a support part and is displaceably received in the axial direction of a rotational axis of the wheel hub relative to the support part.

19 Claims, 1 Drawing Sheet

(51) Int. Cl.
*F16D 65/18* (2006.01)
*F16D 121/02* (2012.01)
*F16D 125/40* (2012.01)

(52) U.S. Cl.
CPC .. *B60K 2007/0092* (2013.01); *F16D 2121/02* (2013.01); *F16D 2125/40* (2013.01)

(58) Field of Classification Search
CPC ............ B60K 7/0007; B60K 2001/001; B60K 2007/0092
USPC ....................................................... 188/72.4
See application file for complete search history.

(56) References Cited

U.S. PATENT DOCUMENTS

| | | | |
|---|---|---|---|
| 2006/0158050 A1 | 7/2006 | Maeda et al. | |
| 2011/0316322 A1* | 12/2011 | Abiko | F16D 65/18 |
| | | | 301/6.5 |
| 2014/0028081 A1* | 1/2014 | Han | B60K 7/0007 |
| | | | 301/6.5 |
| 2014/0368092 A1 | 12/2014 | Shiraki et al. | |
| 2015/0084397 A1* | 3/2015 | Kudo | B60B 35/16 |
| | | | 903/952 |
| 2018/0087583 A1* | 3/2018 | Trinkenschuh | F16D 13/54 |
| 2019/0085910 A1* | 3/2019 | Trinkenschuh | F16D 21/08 |
| 2022/0001735 A1* | 1/2022 | Finkenzeller | F16D 13/54 |

FOREIGN PATENT DOCUMENTS

| | | | | |
|---|---|---|---|---|
| CN | 106274465 | | 1/2017 | |
| CN | 107428238 | | 12/2017 | |
| CN | 107487175 | | 12/2017 | |
| CN | 108340768 A | * | 7/2018 | ........... B60K 17/046 |
| CN | 110382898 | | 10/2019 | |
| DE | 19732637 A1 | * | 2/1999 | ........... B60K 17/046 |
| DE | 102017111229 | | 5/2018 | |
| DE | 102017104743 | | 9/2018 | |
| JP | S6392837 A | | 4/1988 | |

* cited by examiner

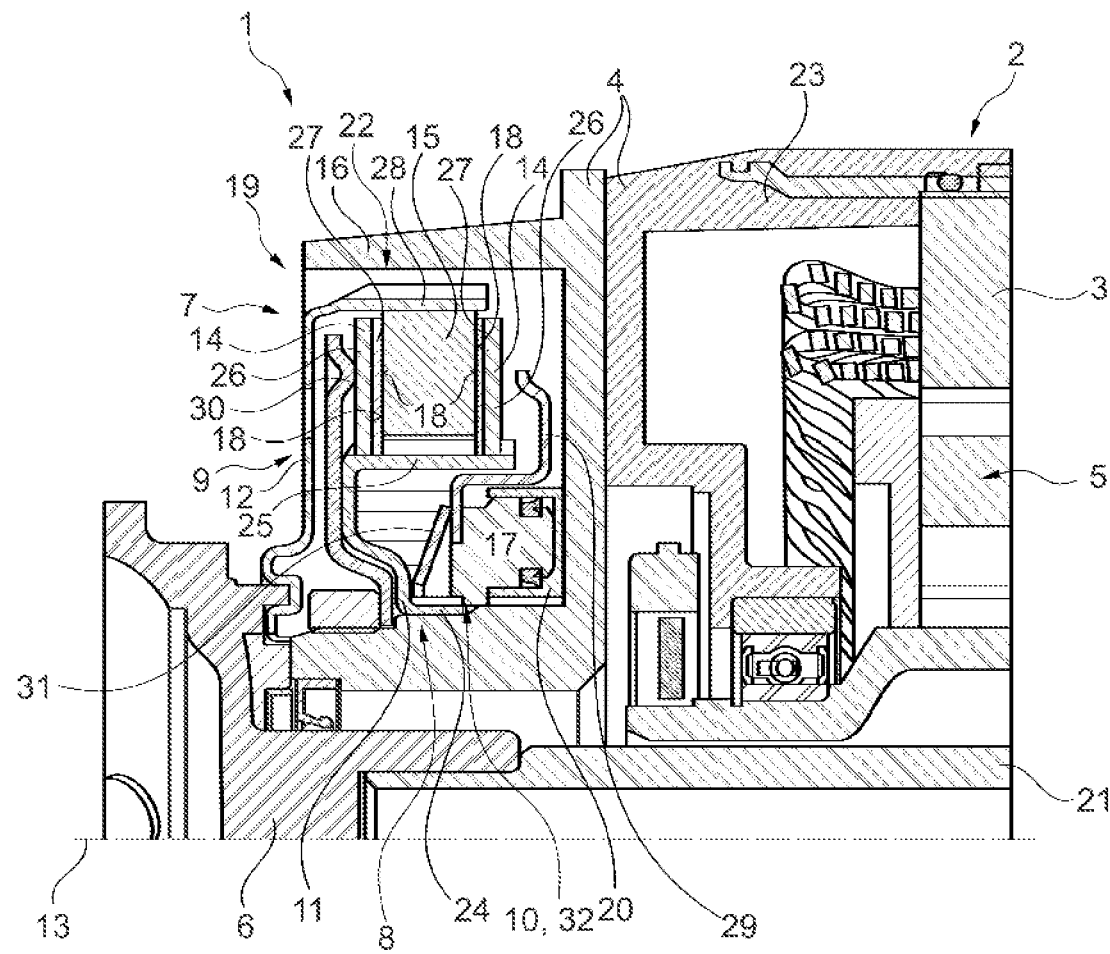

ELECTRIC AXLE DRIVE UNIT WITH INTEGRATED BRAKE DEVICE WITH AXIALLY MOVABLE BRAKE DISC ELEMENT

CROSS-REFERENCE TO RELATED APPLICATIONS

This application is the U.S. National Phase of PCT Appln. No. PCT/DE2019/101098, filed Dec. 17, 2019, which claims priority to DE 102019100738.4, filed Jan. 14, 2019, the entire disclosures of which are incorporated by reference herein.

TECHNICAL FIELD

The disclosure relates to an electric axle drive unit (also referred to as an electric axle/e-axle) for a motor vehicle, such as a car, truck, bus, or other commercial vehicle. The electric axle drive unit is also preferably used in a motor vehicle, such as a hybrid vehicle (in connection with an internal combustion engine) or a purely electrically driven vehicle.

BACKGROUND

In the case of generally known e-axles of purely electrically powered vehicles, the energy from the braking process is normally recuperated. However, if a battery is full or during an emergency braking process, briefly during deceleration greater than approx. 0.5 G, in which the use of ABS is usually necessary, an additional brake is required in principle. In vehicles with electric drives that are currently on the market, an additional conventional mechanical brake system is therefore installed, which is designed separately to form an electric drive unit. This often takes up a relatively large amount of installation space.

SUMMARY

It is thus the object of the present disclosure to provide an electric axle drive unit which enables a more compact design and is nevertheless easy to assemble.

This is achieved according to the disclosure by an electric axle drive unit with one or more of the features described herein. Accordingly, an electric axle drive unit for a motor vehicle is disclosed, which axle drive unit has an electric motor, wherein a stator of the electric motor is fixedly received in a housing and a rotor of the electric motor which is rotatably mounted relative to the stator is rotatably coupled to a wheel hub or (preferably via a gear and/or a clutch) can be rotatably coupled. The electric axle drive unit also has a brake device received in or on the housing and operatively connected to the wheel hub, wherein the brake device also has a first brake component that is fixedly supported on the housing, a first brake component that is rotationally coupled to the wheel hub, a second brake component that is arranged and designed to be frictionally connected with the first brake component, as well as an actuation unit designed to apply a braking force that interconnects the brake components and attached to the housing. At least one of the brake components also has a support part and a brake disc element which is connected to the support part in a rotationally fixed manner and is received so as to be displaceable in an axial direction of a rotational axis of the wheel hub relative to the support part.

This results in a compact electric axle drive unit with a particularly powerful brake device implemented as a braking module.

Further advantageous embodiments are explained in more detail below.

Accordingly, it is also advantageous if the brake device is integrated in a cover element of the housing. The cover element is further preferably shaped in such a way that it delimits a receiving space which receives the brake device and which receiving space is open in the axial direction. As a result, a braking module that is easy to assemble and integrated is realized, from which the resulting brake heat is dissipated directly to the environment.

If the actuation unit is implemented as a hydraulically actuated actuation unit, this is realized in a particularly powerful manner. It is useful if the actuation unit has a hydraulic brake cylinder.

With regard to the design of the actuation unit, it is also expedient if it has several pressure pistons distributed in a circumferential direction, i.e., realized as a multi-piston brake, or has an annular pressure piston arranged to be concentric to the rotational axis, i.e., realized as a concentric actuation unit. As a result, the actuation unit is designed to be particularly compact, but is used to apply a sufficiently high braking force to the brake disc elements.

For the assembly, it is particularly advantageous if both brake components each have a support part and a brake disc element which is connected to the support part in a rotationally fixed manner and is displaceably received in an axial direction of the rotational axis of the wheel hub relative to the support part. This results in a brake device that is easy to assemble and can be designed in a space-saving manner.

Accordingly, it is preferred to receive a first brake disc element of the first brake component so as to be displaceable in the axial direction relative to a first support part of the first brake component. It is also advantageous if a second brake disc element of the second brake component is received so as to be displaceable in the axial direction relative to a second support part of the second brake component.

It has also proven to be useful if the first brake component has two (first) brake disc elements and the second brake component has one (second) brake disc element. A second brake disc element of the second brake component is then preferably arranged between two first brake disc elements of the first brake component.

It is also expedient if the first brake disc element and/or the second brake disc element has/have a braking surface that runs continuously in the circumferential direction or a plurality of braking surfaces that are distributed in the circumferential direction and are spaced apart from one another.

If a friction unit formed by the brake components is arranged to be nested with the actuation unit in the axial direction, the installation space is used even more efficiently.

In this regard, it is expedient if the actuation unit with the actuator housing thereof and/or the actuator thereof, preferably the pressure piston, which is displaceably received in the actuator housing, is arranged radially inside the brake disc elements. This saves significantly on axial installation space.

If the actuation unit with the actuator housing thereof and/or the actuator thereof, which is displaceably received in the actuator housing, is arranged axially at the same height as at least one of the brake disc elements, this axial compactness is further increased.

In other words, according to the disclosure, an integrated braking module (brake device) is implemented in an e-axle (electric axle drive unit) having an axially movable brake disc (brake disc elements). An actuation unit can either be implemented as a concentric brake cylinder, possibly with a concentric annular piston, or as a multi-piston system. The brake (brake device) has an axially translocatable brake disc. It is a multi-disc brake/multi-disc clutch in which the inner disc carrier (first support part) is attached to the housing and the outer disc carrier (second support part) is connected to an output part. No access is required for actuation, since actuation takes place from a side opposite the multi-disc carriers. The friction device (friction unit) and actuation device (actuation unit) are nested axially, which means that an axially short structure is realized.

BRIEF DESCRIPTION OF THE DRAWINGS

In the following, the disclosure is now explained in more detail with a FIGURE.

The single FIG. 1 shows a longitudinal sectional view of a region of an electric axle drive unit according to the disclosure according to a preferred exemplary embodiment, wherein a housing in the region of an electric motor and a brake device and a wheel hub are visible.

DETAILED DESCRIPTION

The FIGURE is only schematic in nature and serves only for understanding the invention.

The single FIG. 1 illustrates an electric axle drive unit 1 according to the disclosure which, according to a preferred exemplary embodiment, is part of a motor vehicle/motor vehicle drive train. The electric axle drive unit 1, also referred to as an e-axle, has an integrated electric motor 2. The electric motor 2 is used during operation to drive a wheel hub 6 or an axle shaft 21 that is rotatably fixed to the wheel hub 6. The electric motor 2 is arranged with the stator 3 thereof and the rotor 5 thereof, which is rotatably mounted relative to the stator 3, to be concentric to a central rotational axis 13 of the wheel hub 6/axle shaft 21. The stator 3 is fixedly received in a housing 4 of the axle drive unit 1. The axle shaft 21 penetrates the electric motor 2 in the axial direction (along the rotational axis 13) and is arranged radially inside the rotor 5. The axle shaft 21 and the wheel hub 6 are typically rotatably mounted relative to the housing 4.

The direction designations axial, radial, and circumferential direction relate to the central rotational axis 13. Consequently, an axial direction is a direction along the rotational axis 13, a radial direction is a direction perpendicular to the rotational axis 13 and a circumferential direction is a circular line that runs concentrically around the rotational axis 13.

According to the disclosure, in addition to the electric motor 2, a brake device 7, which has a modular structure, is integrated in the housing 4. The brake device 7 is received on a cover element 16 of the housing 4. The cover element 16 is in turn fastened to a main housing part 23 enclosing the electric motor 2. Radially inside the cover element 16, the wheel hub 6 together with the axle shaft 21 penetrates an axial opening in the housing 4. The completely ring-shaped/ circumferential cover element 16 forms a channel-shaped (ring-shaped, circumferential and open to one axial side) receiving space 22, in which receiving space the brake device 7 is received. The region of the housing 4 (in the form of the cover element 16) receiving the brake device 7 is therefore open to the surroundings on one axial side. Thus, a friction unit 19 formed by the brake device 7 is also open to the environment, which ensures particularly effective ventilation of this friction unit 19 during operation.

The friction unit 19 of the brake device 7 has a first brake component 8 and a second brake component 9. The first brake component 8 is fixed to the housing, that is fixedly connected to the cover element 16/secured against rotating relative to the housing 4. The first brake component 8 has a first support part 11 in the form of an inner support, wherein the first support part 11 is fixedly supported on the cover element 16 (in the circumferential direction) via a toothed region 24. Radially outside of the toothed region 24, the first support part 11 forms a (first) sleeve region 25 running in the axial direction, on which sleeve region 25 two first brake disc elements 14 of the first brake component 8, which are arranged displaceably relative to one another, are received on a radial outside. The first brake disc elements 14 designed as friction discs each have a steel body 26 and a friction lining 27.

The second brake component 9, which interacts with the first brake component 8 and can be brought into frictional contact therewith, is connected to the wheel hub 6 in a rotationally fixed manner. For this purpose, a second support part 12 of the second brake component 9 is fastened directly to the wheel hub 6. The second support part 12, designed as an external carrier, receives a second brake disc element 15 in a rotationally fixed manner on the (second) sleeve region 28 thereof, which is arranged radially outside of the first sleeve region 25. The second brake disc element 15 is arranged between the first brake disc elements 14 in the axial direction. The brake disc elements 14, 15 are each displaceable relative to one another in the axial direction. Each brake disc element 14, 15 has a circumferential braking surface 18 on the side facing the adjacent brake disc element 14, 15, wherein in principle, according to further embodiments, several braking surfaces can also be formed to be distributed in the circumferential direction and spaced apart from one another.

In an actuated/activated position of the brake device 7, the two brake components 8, 9 are frictionally connected to one another (via the brake disc elements 14, 15) and the second brake component 9 is thus held relative to the housing 4. In an unactuated/deactivated position of the brake device 7, the brake components 8, 9 can be freely rotated relative to one another. An actuation unit 10 is provided for adjusting the brake device 7 between the deactivated and activated position thereof. The actuation unit 10 is realized as a hydraulic actuation unit 10 in this embodiment. The actuation unit 10 has a hydraulic brake cylinder 32. The brake cylinder 32 is realized as a concentric brake cylinder 32 and is arranged to be concentric to the rotational axis 13. The brake cylinder 32 has an actuator housing 20 arranged to be concentric to the rotational axis 13. A pressure piston 17 forming an actuator, here an annular piston, alternatively also several individual pressure pistons 17 distributed in the circumferential direction, is received in a relatively displaceable manner within this actuator housing 20. The pressure piston 17 acts on an adjusting element 29 in the form of a pressure pot in a displaceable manner. The adjusting element 29 acts on a first axial side of the entirety of the brake disc elements 14, 15 in a displaceable manner on the brake disc elements 14, 15. An axially fixed counter-plate region 30 is present on an axial side of the totality of the brake disc elements 14, 15 facing away from the actuating elements 29. The counter-plate region 30 is realized as a single element and is also fastened to the cover element 16. To reset the actuation unit 10 into a position corresponding to the deactivated position, a return spring 31 is provided, which is clamped between the first support part 11 and the actuating element 29.

As can also be seen, the brake cylinder 32, i.e., in particular the pressure piston 17 and the actuator housing 20, are arranged in the radial direction within the brake disc elements 14, 15. The brake cylinder 32 is also located in the axial direction at the same level as one of the first brake disc elements 14 and a section of the second brake disc element 15.

In other words, according to the disclosure, a (dry) braking module (brake device 7) is integrated on a wheel axle in front of the articulated shaft. With an e-axle 1, this leads to a compact modular concept. The arrangement 1 shown is preferably dimensioned for braking power in the passenger car sector. Optionally, the arrangement can also be represented in an application with an internal combustion engine or in a hybrid application.

FIG. 1 shows the integrated braking module 7 in the e-axle 1, wherein the braking module 7 is formed in the housing cover 16 and optionally being integratable according to a modular system. The interface that transmits the torque is here the wheel hub 6 or the flange to which the articulated shaft (axle shaft 21) is screwed. The torque is supported on the E-axis housing 4 to which the housing cover 16 is connected (for example with a screw connection). The advantage of this arrangement is that the high temperature that is generated by the braking process can be transported away to the left, open side (of the housing cover 16). The arrangement shown is a dry braking module 7. A braking surface 18 can also be segmented

LIST OF REFERENCE SYMBOLS

1 Axle drive unit
2 Electric motor
3 Stator
4 Housing
5 Rotor
6 Wheel hub
7 Brake device
8 First brake component
9 Second brake component
10 Actuation unit
11 First support part
12 Second support part
13 Rotational axis
14 First brake disc element
15 Second brake disc element
16 Cover element
17 Pressure piston
18 Braking surface
19 Friction unit
20 Actuator housing
21 Axle shaft
22 Receiving space
23 Main housing part
24 Toothing region
25 First sleeve region
26 Steel body
27 Friction lining
28 Second sleeve region
29 Actuating element
30 Counter-plate region
31 Return spring
32 Brake cylinder

The invention claimed is:

1. An electric axle drive unit for a motor vehicle, the electric axle drive unit comprising:
   an electric motor having, a stator fixedly received in a housing and a rotor rotatably mounted relative to the stator, the rotor being rotationally coupled or rotationally couplable to a wheel hub;
   a brake device received in or on the housing that is operatively connected to the wheel hub, such that the brake device is open on a first axial end and closed on a second axial end, the brake device including a first brake component fixedly supported on the housing, a second brake component rotationally coupled to the wheel hub, the second brake component being configured to be frictionally connected to the first brake component;
   an actuation unit configured to apply a braking force that interconnects the brake components, the actuation unit is attached to the housing; and
   at least one of the brake components includes a support part and a brake disc element which is rotationally fixed to the support part and is displaceably received in an axial direction of a rotational axis of the wheel hub relative to the support part, wherein the actuation unit includes an actuator housing and an actuator displaceably received in the actuator housing, and at least one of the actuator housing or the actuator is arranged to be radially inside the brake disc elements.

2. The axle drive unit according to claim 1, wherein the brake device is integrated into a cover element of the housing.

3. The axle drive unit according to claim 1, wherein the actuation unit comprises hydraulically actuated actuation unit.

4. The axle drive unit according to claim 1, wherein the actuation unit includes a plurality of pressure pistons distributed in a circumferential direction or an annular pressure piston arranged to be concentric to the rotational axis.

5. The axle drive unit according to claim 1, wherein the brake disc element comprises a first brake disc element of the first brake component that is displaceably received in the axial direction relative to the support part which comprises a first support part of the first brake component.

6. The axle drive unit according to claim 1, wherein the brake disc element comprises a second brake disc element of the second brake component that is displaceably received in the axial direction relative to the support part which comprises a second support part of the second brake component.

7. The axle drive unit according to claim 6, wherein the second brake disc element has a braking surface that runs continuously in a circumferential direction or a plurality of braking surfaces that are distributed in the circumferential direction and are spaced apart from one another.

8. The axle drive unit according to claim 1, wherein a friction unit formed by the brake components is nested with the actuation unit in the axial direction.

9. The axle drive unit according to claim 1, wherein at least one of the actuator housing or the actuator is arranged axially at a same height as at least one of the brake disc elements.

10. The axle drive unit according to claim 5, wherein the first brake disc element has a braking surface that runs continuously in a circumferential direction or a plurality of braking surfaces that are distributed in the circumferential direction and are spaced apart from one another.

11. An electric axle drive unit for a motor vehicle, the electric axle drive unit comprising:
- an electric motor having a stator fixedly received in a housing and a rotor rotatably mounted relative to the stator, the rotor being radially inward of the stator, and the rotor being rotationally coupled or rotationally couplable to a wheel hub through an axle shaft positioned radially inward of the rotor;
- a brake device in or on the housing that is operatively connected to the wheel hub, the brake device including a first brake component fixedly supported on the housing, a second brake component rotationally coupled to the wheel hub, the second brake component being configured to be frictionally connected to the first brake component;
- an actuator configured to apply a braking force that interconnects the brake components;
- the first brake component includes a first support part and a first brake disc that is rotationally fixed to the first support part and is displaceable in an axial direction of a rotational axis of the wheel hub relative to the first support part; and
- the second brake component includes a second support part and a second brake disc that is rotationally fixed to the second support part and is displaceable in the axial direction of the rotational axis of the wheel hub relative to the first support part.

12. The axle drive unit according to claim 11, wherein the brake device is integrated into a cover element of the housing.

13. The axle drive unit according to claim 11, wherein the actuator is hydraulically actuated.

14. The axle drive unit according to claim 13, wherein the actuator includes a plurality of pressure pistons distributed in a circumferential direction or an annular pressure piston arranged to be concentric to the rotational axis.

15. The axle drive unit according to claim 11, wherein at least one of the first or the second brake discs has a braking surface that runs continuously in a circumferential direction.

16. The axle drive unit according to claim 11, wherein at least one of the first or the second brake discs has a plurality of braking surfaces that are distributed in a circumferential direction and are spaced apart from one another.

17. The axle drive unit according to claim 11, wherein the first and the second brake components form a friction unit that is nested with the actuator in the axial direction.

18. The axle drive unit according to claim 11, wherein the actuator includes an actuator housing and a piston displaceably received in the actuator housing, and at least one of the actuator housing or the piston is arranged to be radially inside the brake discs.

19. The axle drive unit according to claim 11, wherein the actuator includes an actuator housing and a piston displaceably received in the actuator housing, and at least one of the actuator housing or the piston is arranged at a same axial position as at least one of the brake discs.

* * * * *